United States Patent [19]
Bales et al.

[11] Patent Number: 5,701,295
[45] Date of Patent: Dec. 23, 1997

[54] VARIABLE COMMUNICATION BANDWIDTH FOR PROVIDING AUTOMATIC CALL BACK AND CALL HOLD

[75] Inventors: Bruce Merrill Bales, Louisville; Stephen Max Thieler, Boulder, both of Colo.

[73] Assignee: Lucent Technologies Inc., Murray Hill, N.J.

[21] Appl. No.: 451,296

[22] Filed: May 26, 1995

[51] Int. Cl.$^6$ ........................................ H04J 3/12
[52] U.S. Cl. ............... 370/271; 370/468; 370/522; 379/162; 379/209
[58] Field of Search .............. 370/85.7, 79, 80, 370/60, 60.1, 94.1, 95.1, 84, 118, 110.1, 111, 62, 271, 276, 294, 464, 465, 468, 477, 522, 545, 431, 437, 260; 379/202, 203, 204, 205, 206, 209, 215, 158, 157, 162, 393, 165, 257

[56] References Cited

U.S. PATENT DOCUMENTS

| | | | |
|---|---|---|---|
| 3,854,014 | 12/1974 | Akin et al. | 379/209 |
| 4,796,293 | 1/1989 | Blinken et al. | 379/202 |
| 5,115,429 | 5/1992 | Hluchyj et al. | 370/94.3 |
| 5,182,751 | 1/1993 | Bales et al. | 370/110.1 |
| 5,195,086 | 3/1993 | Baumgartner et al. | 370/62 |
| 5,309,505 | 5/1994 | Szlam et al. | 379/162 |
| 5,313,454 | 5/1994 | Bustini | 370/60.1 |
| 5,371,534 | 12/1994 | Dagdeviren et al. | 348/14 |
| 5,477,542 | 12/1995 | Takahara et al. | 370/79 |
| 5,495,285 | 2/1996 | Fujioka | 379/202 |

OTHER PUBLICATIONS

International Telecommunication Union (ITU-T, Telecommunication Standardization Sector of ITU, H.320, (Mar. 1993), Recommendation H.320, pp. 1–12.

*Primary Examiner*—Wellington Chin
*Assistant Examiner*—Huy D. Vu
*Attorney, Agent, or Firm*—John C. Moran

[57] ABSTRACT

Automatically reducing communication bandwidth to coincide with the state of a communication call by a communication terminal. If a first telecommunication terminal puts a second telecommunication terminal on hold, the first telecommunication terminal transmits a transport message that reduces the bandwidth of the call to a low speed data link. When the first telecommunication terminal wishes to again be in communication with the second telecommunication terminal, a transport message is utilized to restore the communication bandwidth. If a first communication terminal calls a second communication terminal and the second communication terminal is busy, the first communication terminal reduces the bandwidth of the communication call to that of a low speed data link. When the second telecommunication terminal becomes idle, the second terminal sends a message to the first terminal indicating the idle state. The first telecommunication terminal then uses a transport message to increase the communication bandwidth to the desired amount and engages the second communication terminal in a communication call.

28 Claims, 11 Drawing Sheets

TRANS 300 (TRANSPORT MESSAGE)

TRANS_ACK 310 (TRANSPORT ACKNOWLEDGE)

TRANS_COM 320 (TRANSPORT COMPLETE MESSAGE)

TRANS_REJ 330 (TRANSPORT REJECT MESSAGE)

VARIABLE COMMUNICATION BANDWIDTH FOR PROVIDING AUTOMATIC CALL BACK AND CALL HOLD

CROSS-REFERENCE TO RELATED APPLICATIONS

B. M. Bales and S. M. Thieler, Case 26-19, "Adjustment Of Call Bandwidth During A Communication Call, Ser. No. 08/451,282, U.S. Pat. No. 5,574,724";

B. M. Bales and S. M. Thieler, Case 31-22, "Variable Communication Bandwidth For Conference Call Initiation, Ser. No. 08/452,458";

B. M. Bales and S. M. Thieler, Case 32-23, "Selective Participation In A Multimedia Communication Conference Call, Ser. No. 08/451,297"; and B. M. Bales and S. M. Thieler, Case 34-24, "Multimedia Conference Call Providing Adjustable Bandwidth For Individual Communication Terminals, Ser. No. 08/452,484, U.S. Pat. No. 5,590,127".

These applications are filed concurrently with this application and are assigned to the same assignee.

TECHNICAL FIELD

This invention relates to telecommunications switching and, in particular, to using variable communication bandwidth for providing automatic call back and call hold.

BACKGROUND OF THE INVENTION

With the advent of new multimedia telecommunication services, the cost of the bandwidth necessary to support certain types of calls has become an increasingly important factor. For example, if two telephone terminals are engaged in a call that includes video, high speed data transfer for screen sharing between two personal computers, and voice, the cost of the bandwidth becomes important for long distance communication. Call hold is a well known feature that allows one party of a telephone call to place the other party of the telephone call in a state where they cannot hear conversation that is taking place by the first party. As implemented by prior art telecommunication switching systems, call hold maintains the bandwidth of the call from the local telephone office serving the first party to the second party. For a long distance call, the result is that the parties are still paying for the long distance call while the call is on hold. In ordinary voice telephone calls, this has not been an important cost factor but is an important cost factor for a multimedia call.

The automatic call back feature allows a calling party to actuate a button on the calling telephone terminal when a busy signal is received back from the called telephone terminal. When the called telephone terminal becomes idle, a call is set up between the calling telephone terminal and the called telephone terminal. In the prior art, the automatic call back feature has long been provided by customer telecommunications switching systems (often referred to as PBX). However this feature is very complex when provided by a network of customer telecommunication switching systems, since it requires each of the customer telecommunication switching systems to be specially programmed for this feature. Because of this complexity, this feature is not provided across the public telephone network. U.S. Pat. No. 5,012,466 discloses the provision of automatic call back services utilizing a network of telecommunication switching systems. Another such system is set forth in U.S. Pat. No. 4,899,374.

Another method for providing automatic call back is illustrated in U.S. Pat. No. 4,899,374. This discloses the use of a separate control system with a telephone to provide the automatic call back feature. If the user is unable to complete the call when originally dialed, the control system repeatedly tries at predefined intervals to complete the call. The problem with that method is that the control system is repeatedly placing calls thus tying up the telecommunication switching system, and further, the predefined interval has to be reasonably long. The called party may hang up from one telephone call and start a second telephone call before the control system redials attempting to perform automatic call back.

The problem of providing automatic call back service becomes even more complex when trying to perform this service for multimedia calls. The method proposed in U.S. Pat. No. 4,899,374 would constantly be utilizing large amounts of bandwidth each time a call was attempted. When the control system attempts to place the call, it needs to request the necessary bandwidth to support a multimedia call. A similar problem exists in U.S. Pat. Nos. 4,899,374 and 5,012,466. In addition, the facilities and bandwidth required for the call when it is finally completed by automatic call back may have changed from when the original call was made. Finally, if the call was made through a combination of private and public networks, providing the call back can be very difficult.

SUMMARY OF THE INVENTION

The foregoing problems are solved and a technical advance is achieved by communication terminals that automatically reduce communication bandwidth to coincide with the state of a communication call. Advantageously, if a first telecommunication terminal puts a second telecommunication terminal on hold, the first telecommunication terminal transmits a transport message that reduces the bandwidth of the call to a low speed data link. When the first telecommunication terminal wishes to again be in communication with the second telecommunication terminal, a transport message is utilized to restore the communication bandwidth.

Advantageously, if a first communication terminal calls a second communication terminal and the second communication terminal is busy, the first communication terminal reduces the bandwidth of the communication call to that of a low speed data link. When the second telecommunication terminal becomes idle, the second terminal sends a message to the first terminal indicating the idle state. The first telecommunication terminal then uses a transport message to increase the communication bandwidth to the desired amount and engages the second communication terminal in a communication call.

DETAILED DESCRIPTION

Figure 1:
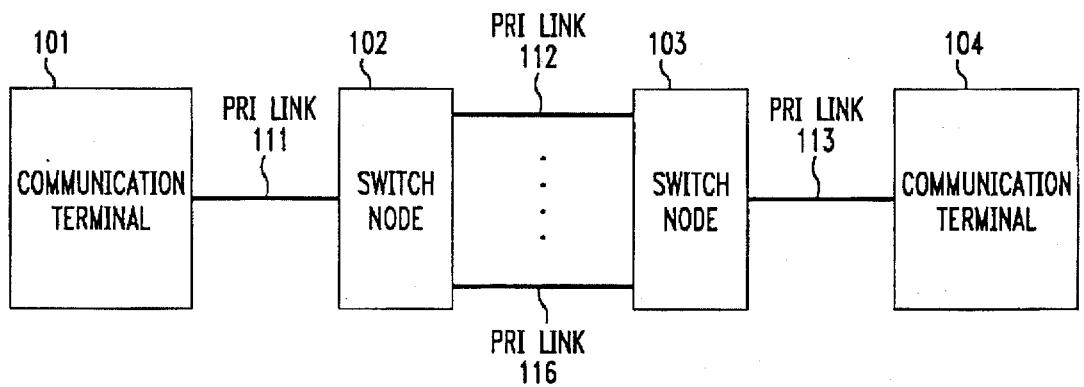
FIG. 1 illustrates a telecommunication system for implementing the inventive concept.

FIG. 1 illustrates communication terminals 101 and 104 interconnected by a switching network consisting of switch nodes 102 and 103. Communication terminal 101 interconnects to switch node 102 via PRI link 111. A PRI link is illustrated as interconnecting communication terminal 101 to switch node 102 because the system assumes that communication terminal 101 will be engaging in video or high speed data calls. One skilled in the art could readily see that similar functions could be performed if PRI link 111 was a BRI link and video and data compression was utilized. Similarly, communication terminal 104 is interconnected to switch node 103 via PRI link 117. Switch nodes 102 and 103 are interconnected by a plurality of PRI links 112 through 116. Further information on the operation and software structure of switch nodes is given in U.S. Pat. No. 5,386,466, entitled "Automatic Initialization of a Distributed Telecommunications System. U.S. Pat. No. 5,386,466, is hereby incorporated by reference. A switch node with a video network is described in U.S. patent application Ser. No. 08/085,997, entitled "Video View Selection by a Chairperson", filed Jun. 30, 1993, and assigned to the same assignee as the present application. U.S. patent application Ser. No. 08/085,997 is hereby incorporated by reference.

To understand how the system of FIG. 1 operates, consider the following two examples. In the first example, communication terminal 101 is interconnected to communication terminal 102 in a communication call involving voice, video and high speed data involving screen sharing. If the user of communication terminal 101 wishes to place communication terminal 104 on call hold, the user chooses the call hold either through the use of a cursor or a designated button on communication terminal 101. Communication terminal 101 is responsive to the initiation of call hold to transmit a transport message to communication terminal 104 via switch node 102 and switch node 103 starting the first portion of the call hold feature. The transport message instructs the switch nodes to change the bandwidth of the call to that of a low speed data link. Communication terminal 104 is also responsive to the transport message to establish data communication via the data link with communication terminal 101. A display element in the transport message informs communication terminal 104 that it is being placed on hold. When the user of communication terminal 101 decides to take communication terminal 104 off of hold, communication terminal 101 transmits a transport message that once again establishes the video, voice, and high speed data through switch nodes 102 and 103 the transmission of the transport message starts the second portion of the call hold feature. Once again, the display element in the transport message informs communication terminal 104 that it is being taken off of hold.

Consider now the second example that illustrates the implementation of automatic call back between communication terminals 101 and 104. In order to establish a communication call having video, high speed data, and voice, communication terminal 101 transmits a setup message to switch node 102 designating that a call is to be set up with communication terminal 104. The setup message designates that the call is to have video, voice, and high speed data communication. When the setup message is received by communication terminal 104, communication terminal 104 determines that it is presently busy with another call. In response to the setup message, communication terminal 104 transmits a transport message to communication terminal 101. This starts the first portion of the automatic call back feature. The transport message changes the call types to a low speed data link. In addition, the display IE of the transport message defines that the automatic call back feature is available on communication terminal 104.

In response to the transport message, communication terminal 101 notifies its user that communication terminal 104 is busy but that automatic call back is available. If the user designates that they do not want to invoke automatic call back, communication terminal 101 drops the call. If the user designates that they wish to invoke the automatic call back feature, communication terminal 101 sends a message to communication terminal 104 to activate the automatic call back feature. When communication terminal 104 is idle, that terminal communicates over the low speed data link to communication terminal 101 that communication terminal 104 is idle. Communication terminal 101 is responsive to transmit a transport message that adds video, voice, and high speed data into the call. This starts the second portion of the automatic call back feature. Thereafter, communication terminal 101 and communication terminal 104 are engaged in the communication call.

Consider the setting up of a simple call to help in the understanding of the operation of the switch nodes and communication terminals illustrated in FIG. 1 with respect to the new transport messages. Assume that communication terminal 101 originates a logical call to communication terminal 104. As is well known in the ISDN signalling protocol, a set up message is first transmitted from communication terminal 101 to communication terminal 104 via switch nodes 102 and 103. Each switch node is responsive to the set up message to establish the necessary call information. Upon receipt of the set up message, communication terminal 104 alerts its user and sends back to communication terminal 101 an alerting message. When the user answers the call, communication terminal 104 transmits to switch node 103 a connect message. Upon receipt of the connect message, switch node 103 establishes a logical path and transmits a connect message to switch node 102 which also establishes a logical path. When the connect message is received by communication terminal 101, it is communicated via logical path that has been established through switch nodes 102 and 103.

Figure 2:
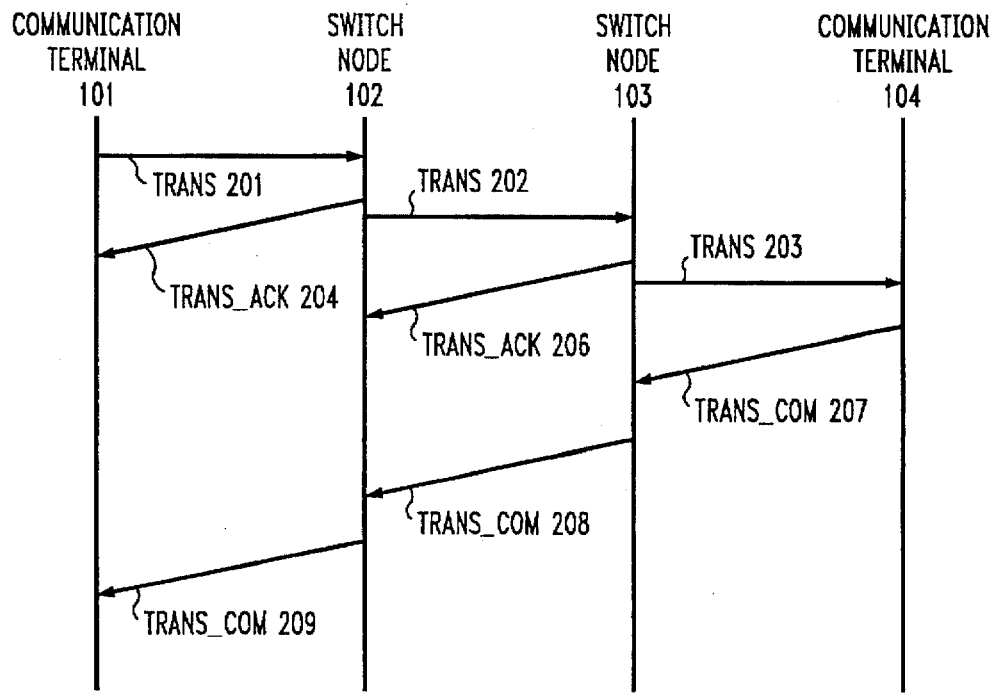
FIG. 2 illustrates the transmission of transport messages within the telecommunication switching network.
Figure 3A:
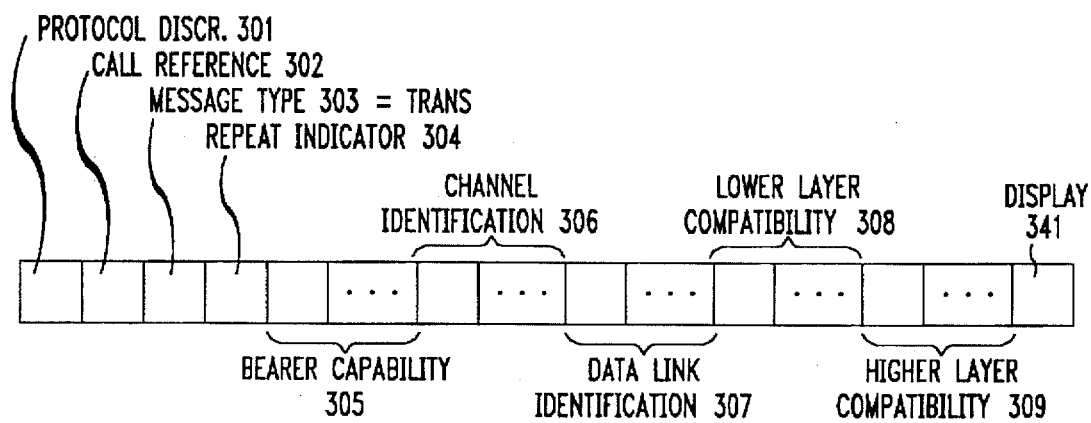
FIG. 3 illustrates the transport messages.
Figure 3B:
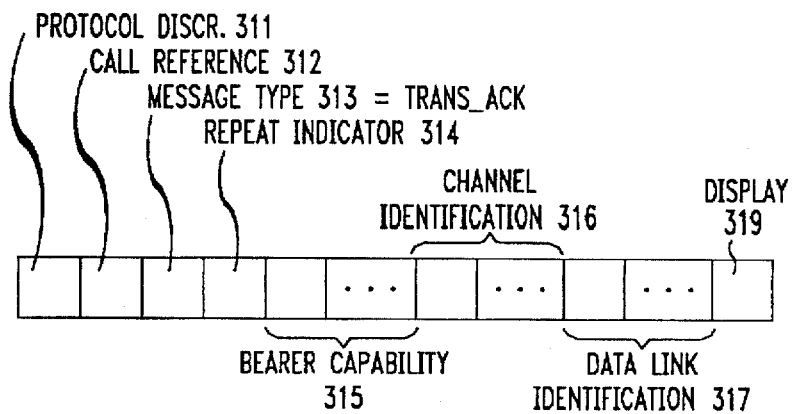
Figure 3C:
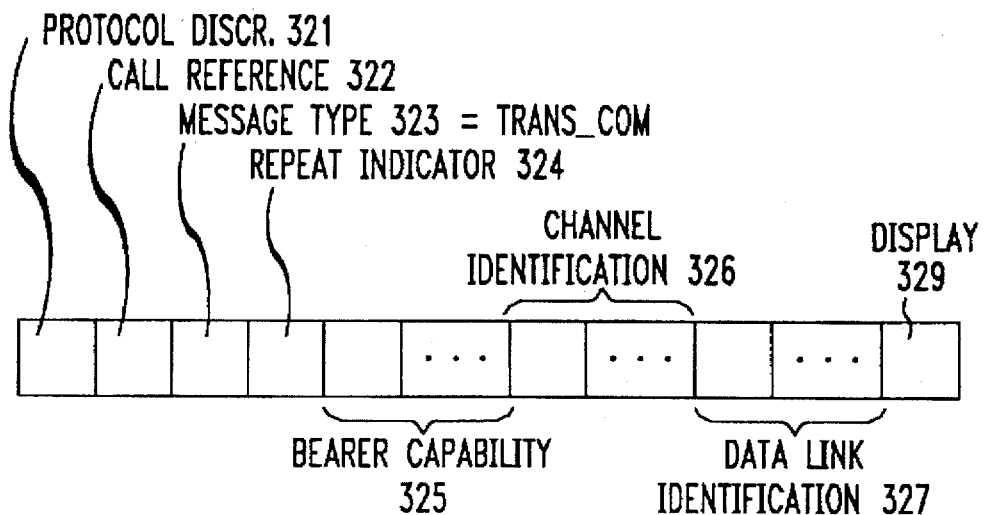
Figure 3D:
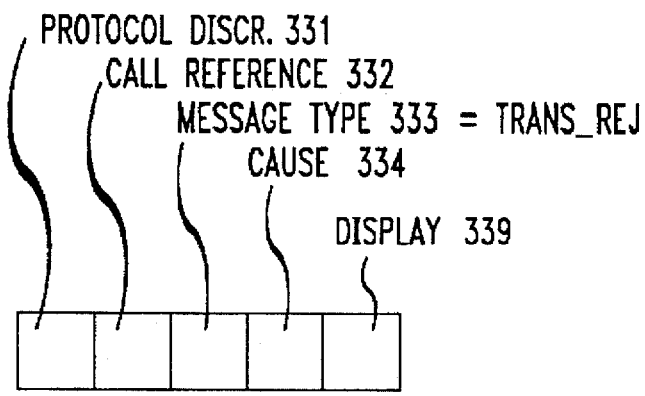

At a subsequent time, the users of communication terminals 101 and 104 desire a video capability so that they can exchange video images. To add video capability to the call, communication terminal 101 transmits TRANS 201 (transport) message as illustrated in FIG. 2 to switch node 102. TRANS 201 message requests that a video capability be added to the call. (The actual contents of the message will be discussed in greater detail later.) If switch node 102 can provide the video capability, it transmits back TRANS_ACK 204 message as illustrated in FIG. 2. In addition, switch node 102 transmits TRANS 202 message of FIG. 2 to switch node 103. This message also requests that a video capability be set up between switch node 102 and switch node 103. Assuming switch node 103 is capable of providing the video capability, it transmits back to switch node 102 TRANS_ACK 206 message and transmits TRANS 203 to communication terminal 104. If communication terminal 104 can provide the video bandwidth, communication terminal 104 transmits to switch node 103 TRANS_COM 207 message. This message is repeated back to communication terminal 101 via switch nodes 103 and 102. If at a still later point in time, the user of communication terminal 101 desires that the video capability be eliminated, the messages illustrated in FIG. 2 are once more sent through the switch nodes. However, the TRANS messages now request that the video bandwidth be removed.

In video and audio calls, the video and the audio capability can be provided in the following two ways: first, a channel can be used for the video and a second channel can be used for the audio. Second, the audio information can be included with the video information in the video channel. The transport message can cause switch nodes to drop the audio channel and add the video channel with the companion audio information.

When processing the transport message, the switch nodes have the capability of negotiating with each other using the transport acknowledge (TRANS_ACK message). To illustrate this capability consider the following example. Communication terminal 101 wishes to add an audio, video and high speed data capabilities to a logical call with communication terminal 104. Communication terminal 101 transmits to switch node 102 a transport message requesting that these three types of bandwidth be added to the call. Switch node 102 has the resources to provide that capability and acknowledges this by the transmission of an acknowledge message to communication terminal 101. Switch node 102 then transmits a transport message to switch node 103. Switch node 103 only has resources sufficient to support audio bandwidth and video bandwidth and transmits this fact to switch node 102 in a transport acknowledge message. Switch node 102 accepts these conditions. Switch node 103 then transmits a transport message to communication terminal 104 requesting that audio and video capabilities be added to the call. Communication terminal 104 only has resources to provide only audio bandwidth. Since communication terminal 104 is the endpoint, it transmits back to switch node 103 a transport complete message. The transport complete message specifies that only audio bandwidth is provided for in this call. Upon receiving the transport complete message, each switch node changes the bandwidth capability for the call to audio only.

FIG. 3 illustrates the details of the four new messages utilized to implement the inventive concepts illustratively with respect to CCITT ISDN Q.931 standard of messages and procedures. One skilled in the art can readily see that the inventive concepts could be applied to other standards. The transport message is TRANS 300. The transport message consists of information elements (IE) 301–309 and 341. Protocol discriminator 301 IE defines the protocol that is being used. It defines that the protocol is ISDN Q.931 in the present embodiment. Call reference IE 302 gives the call reference number that defines the call for which the transport message is modifying the bandwidth. Message type IE 303 is set equal to TRANS since this is the transport message. Repeat indicator IE 304 defines whether the transport message is being used to add, remove, or change bandwidth on the call designated by call reference IE 302.

Bearer capability IEs 305, channel identification IEs 306, data link identification IEs 307, lower layer compatibility IEs 308, and higher layer compatibility IEs 309 define the totality of the transport capabilities being defined by the transport message. Lower layer compatibility IEs 308 and higher layer compatibility IEs 309 are used only by the endpoints. Whereas, bearer capability IEs 305, channel identification IEs 306, and data link identification IEs 307 are utilized by the switching nodes within the network providing transportation for the call. Note, that the endpoints also utilize IEs 305, 306, and 307. Bearer capability IEs 305 define the requested capabilities in high level definitions such as voice, data, and video. The channel identification IEs 306 define the logical interface and physical channel within that physical interface. Between two switching nodes, the switching nodes negotiate a logical interface number for each interface between them. A network layer is responsive to the logical interface number to convert it to a system interface number (sintf) which lower layers convert to a physical interface number. For clarity, the high level description refers to the channel identification IEs as specifying the physical interface. For example, if video is being requested, then one of the channel identification IEs 306 for that request defines the physical interface and the channel such as channel 1 which is a 384 Kbs channel within the specified PRI link. If a voice capability was being requested, one of the channel identification IEs defines a particular B channel such as channel 23. An IE in the bearer capability IEs 305 requesting video has the same position in the bearer capability IEs 305 as the corresponding IE designating the physical interface and channel in the channel identification IEs 306. If packet data links are being requested, these are specified as to physical channels in channel identification IEs 306 with additional information being specified in the data link identification IEs 307. The IEs for data link identification are arranged in order as needed to support channel identification IEs 306. The information in bearer capability IEs 305 specifies when an IE from data identifications IEs 307 is needed. For example, if bearer IEs 305 specified: video, voice, and data, channel identification specifies the physical and only one data link identification IEs 307 is used. This IE would specify what logical link on the physical channel was to be used.

Figure 4:
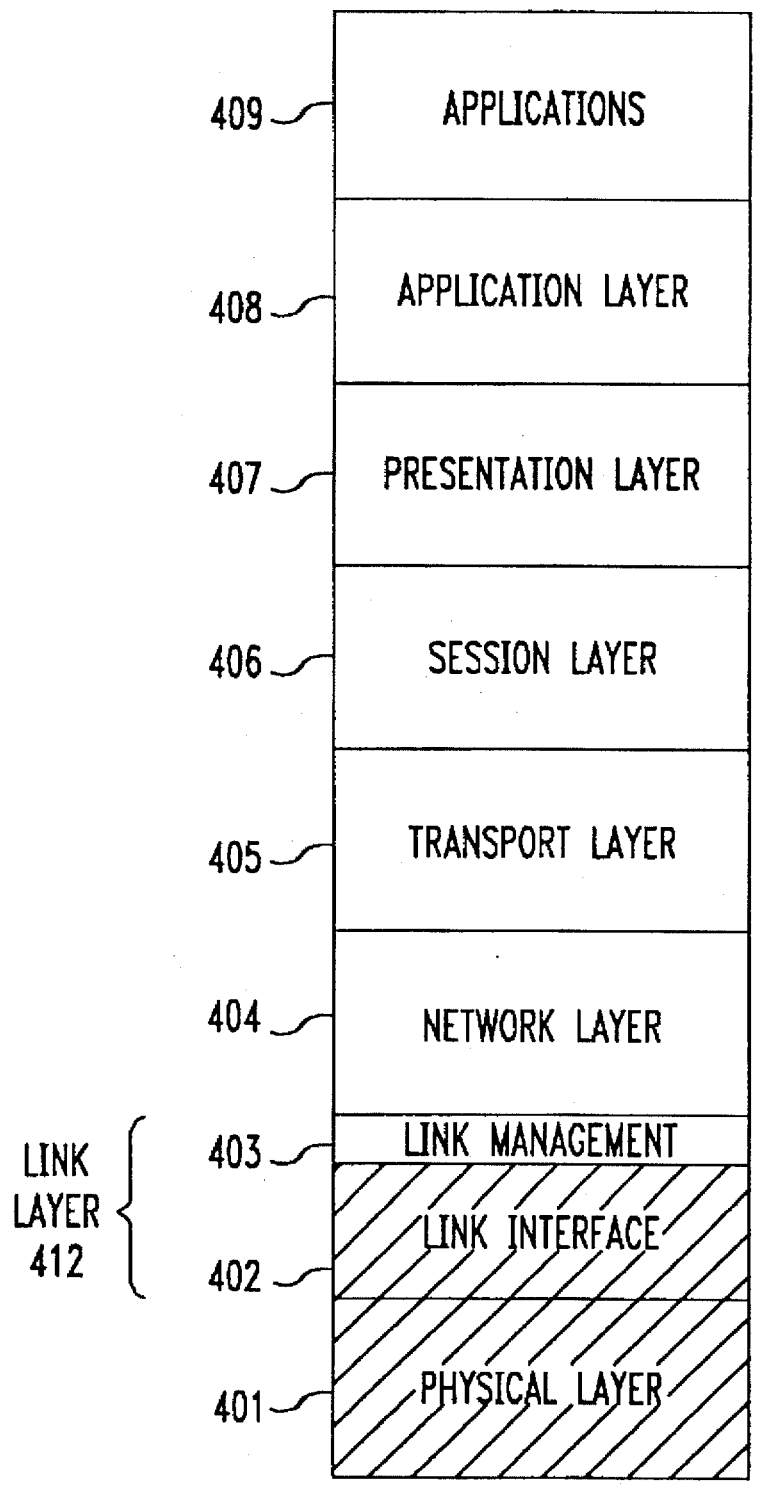
FIG. 4 illustrates a software architecture for use with the inventive concept.

Lower layer capability IEs 308 and higher layer capabilities 309 are usually utilized only by the endpoints, and these IEs are directed to defining for the destination endpoint what type of a call is being set up and the protocol being used. The low layer compatibility IEs 308 are utilized by physical layer, link management layer, and network layer as illustrated in FIG. 4; whereas, higher layer compatibility IEs 309 are utilized by software layers above network layer 404 of FIG. 4. To understand the relationship between the layer capabilities IEs and the bearer capability IEs, consider the following example. If a user wishes to set up a data packet connection utilizing LAPF protocol, from communication terminal 101 to communication terminal 104 the user can do this using two methods. The first method is to specify in the bearer capability that a LAPF packet connection is to be set up. In this case, it is not necessary to include any information in the lower layer capability IEs 308 and may not be necessary to include any information in the higher layer capabilities 309. The switch nodes are responsive to the bearer capabilities to set up the packet switching connection in the most convenient manner. In general, the switch node will set up this packet connection as a packet connection rather than as a circuit connection. In the second example, the user wishes to have a 64 Kb circuit connection set up through switching nodes 102 and 103 and only implement the LAPF protocol at the endpoints, communication terminals 101 and 104. In this case, communication terminal 101 would request in the bearer capability 305 of the transport message a 64 Kbs per second circuit switch connection. The transport message then would include in the lower layer capability of IEs 308 the fact that this is to be a packized data connection utilizing the LAPF protocol. In this manner, the packetized connection is guaranteed to have a predictable transmission time through switching nodes 102 and 103. In addition, the purpose may be to run a proprietary packet protocol on the circuit switch 64 Kbs data connection through switch nodes 102 and 103. Higher layer capability IEs 309 define to presentation layer 407 of FIG. 4 the high layer protocols that are to be used with information being received by the network layer. Presentation layer 407 conditions messages for use by the applications in applications layer 409 of FIG. 4. Examples of the types of protocols that presentation layer 407 may operate with are: X400 email standard, g4 fax standard, file transfer, or screen sharing standard. As can be easily seen, these higher level protocols are of no concern to the intervening switching nodes 102 and 103.

The transport acknowledge message, TRANS_ACK 310 is illustrated in FIG. 3. IEs 311, 312, 314 have identical functions to those described for IEs 301,302, and 304. Message type IE 313 is set equal to TRANS_ACK. Upon receiving a transport message, a switch node within the network responds with a transport acknowledge message. If the receiving switching node can provide all of the transport capabilities requested in IEs 305, 306, and 307, the transport acknowledge message only consists of IEs 311–314. If the receiving switching node cannot provide a particular transport capability, that transport capability is defined in IEs 315 and 316 or IEs 317 and 316. For example, if the transport message has requested video transport which the receiving switching node cannot provide, then the video capability is specified in IEs 315 and 316 of the transport acknowledge message. Display IE 319 may define the reasons why this capability is not provided. If the sending switching node does not wish to accept the reduction of transport capabilities, the sending switching node's only option is to abandon the transport message request. Once again, call reference IE 312 defines which call the transport acknowledge message is associated with.

The transport complete message, TRANS_COM 320 is also illustrated in FIG. 3. The transport complete message is utilized to define to each switching node that is communicating the call the resulting transportation capabilities that have been added, removed, or changed with respect to the call. If all switching networks in the call path have accepted the requested transport capability, the transport complete message consists only of IEs 321–324. If one or more of the requested transport capabilities cannot be provided those capabilities are defined in IEs 325, 326, and 327. Each switching node in the call path retains a record of any transport capability that it may have eliminated from the receive transport message and includes this eliminated transport capability in the transport complete message. The result is that when the originating endpoint receives the transport complete message that message defines to the originating endpoint what the transport capability of the call is. Also, as intervening switching network nodes receive the transport complete message they eliminate transport capability that they had agreed to provide for the call if that transport capability is not present in the transport complete message.

Transport reject message, TRANS_REJ 330 is utilized to reject a transport message. IEs 331–333 and 339 are identical in function to IEs 301–303 and 341 of the transport message. IE 334 defines the reason why the transport message is being rejected.

FIG. 4 illustrates the software architecture of the switching nodes and communication terminals of FIG. 1. This architecture is based on the conventional OSI model modified to implement the ISDN protocol. In accordance with the invention as described herein, certain further modifications have been made to the standard model in order to include ISDN capabilities.

The principal function of physical layer 401 is to terminate physical links. Specifically, physical layer 401 is responsible for maintaining physical channels and for controlling physical subchannels thereon. Physical layer 401 comprises a software portion and physical interfaces. Further, the software portion of physical layer 401 is responsible for the direct control of the physical interfaces to which physical links communicating PRI and BRI information terminate. Physical layer 401 presents to link layer 412 physical subchannels and physical channels as entities controllable by link layer 412.

The primary function of link layer 412 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 412 and physical layer 401. (An example of this type of protocol is the LAPD packet protocol used in ISDN Q.921. In the ISDN standard, link layer 412 terminates the LAPD protocol.) Link layer 412 can support multiple protocols so that the upper layers are uneffected by the different protocols being utilized. Further, link layer 412 allows higher software layers to control physical layer 401 in an abstract manner.

As seen in FIG. 4, link layer 412 is divided into link interface 402 and link management 403. The reason for this division is set forth herein below. It will be helpful at this point to discuss the communication of ISDN signals over a D channel to help readers, for example, who have only a rudimentary knowledge of the communication of ISDN signals over a D channel. At link layer 412, a plurality of logical links is established on a D channel. Only one of these logical links communicates ISDN control signals, and this logical link is referred to herein as a logical D channel (LDC). The LDC is identified by a logical D channel number (LDCN).

Link interface 402 does the majority of the functions performed by link layer 412, including the establishment of the logical links. Link management 403 identifies the various link interfaces for higher software layers. Further, link management communicates information between the logical links and higher software layers.

Network layer 404 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if communication terminal 101 receives a call from switching node 102 via PRI link 150, network layer 404 of communication terminal 101 negotiates with its peer layer (the corresponding network layer 404 in switching node 102) in order to obtain allocation of a B channel in PRI link 150—a procedure later to be repeated if a second B channel is desired. This negotiation is carried out using standard ISDN Q.931 messages such as the call setup and connection messages via the LDC setup on the D channel of PRI link 150. Network layer 404 identifies all B channels of given interface with the LDC for that interface. Network layer 404 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 404 receives information from another node concerning a call via a LDC. As information is received on the LDC, a call reference number is utilized to identify the call associated with this message. The call reference number is selected by the originating network layer during call setup in accordance with the ISDN standard. Details of this identification are given with respect to FIG. 14.

Transport layer 405, is the key element that allows the routing of a call through a complex system having multiple nodes as illustrated in FIG. 1. Its primary function is to manage the routing of calls externally, i.e., between switching nodes. Transport layer 405 views the system of FIG. 1 in terms of nodes and is concerned with routing calls from its own node to other nodes or endpoints. (As explained in the detailed discussion of session layer 406, that layer, not transport layer 405, interprets logical destination information, such as a telephone number, to determine the destination node of a call and to establish an intra-node path by using the connection manager application.) In an overall system comprising multiple switching nodes such as communication terminal 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 405 is the first layer that starts to take a global view of the overall system illustrated in FIG. 1. Transport layer 405 uses information provided by session layer 406 to select the inter-node path. The transport layer performs its task of routing between various nodes by the utilization of tables defining the available paths and the options on those paths. These tables do not define all paths but only those paths which the node has already used.

Communication between transport layers is done by network layer 404 using established LDCs. Transport layer 405 communicates information destined for its peers to network layer 404, and network layer 404 packages this information within the information elements, IEs, of standard ISDN Q.931 messages. Network layer 404 uses the LDC that has been set up to a particular node to communicate this information to its peer network layer. Similarly, when another network layer receives information of this type, the other network layer unpackages information and then directs the information to the transport layer.

The primary function of session layer 406 is to establish communication among endpoints with all endpoints considered to be applications including, for example, a BRI station set is considered an application. Significantly, these endpoints may be applications such as the application performing the call processing features or the dialing plan application. In any event, connections between such endpoints is considered a call. A session (call) is set up by session layer 406 any time two applications require communication with each other. As noted earlier, session layer 406 deals only in terms of switching nodes and applications on those switching nodes and relies on transport layer 405 to establish paths to other switching nodes. Session layer 406 identifies the called application by an address which previously in the telecommunication art was thought of as only a telephone number but has a much broader concept in the Q.931 protocol. From this address, session layer 406 determines the destination switching node. Session layer 406 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 407 of FIG. 4 invokes a complex protocol in order to groom the information being communicated between applications so that the applications are totally divorced from the protocol used to communicate the information. A presentation level protocol allows an application to communicate with a peer application across a transport path.

Finally, application layer 408 manages the resources needed by the applications running at software layer 409. When an application at software layer 409 is communicating with another peer application, the application is unaware of how many other applications exist or where these other applications are located. It is the function of application layer 408 to determine and use such details, consequently allowing the applications to be written in a very abstract manner.

Further information on the operation and software structure of layers 401 through 409 is given in U.S. Pat. No. 5,386,466, entitled "Automatic Initialization of a Distributed Telecommunications System. U.S. Pat. No. 5,386,466 is hereby incorporated by reference.

Figure 5:
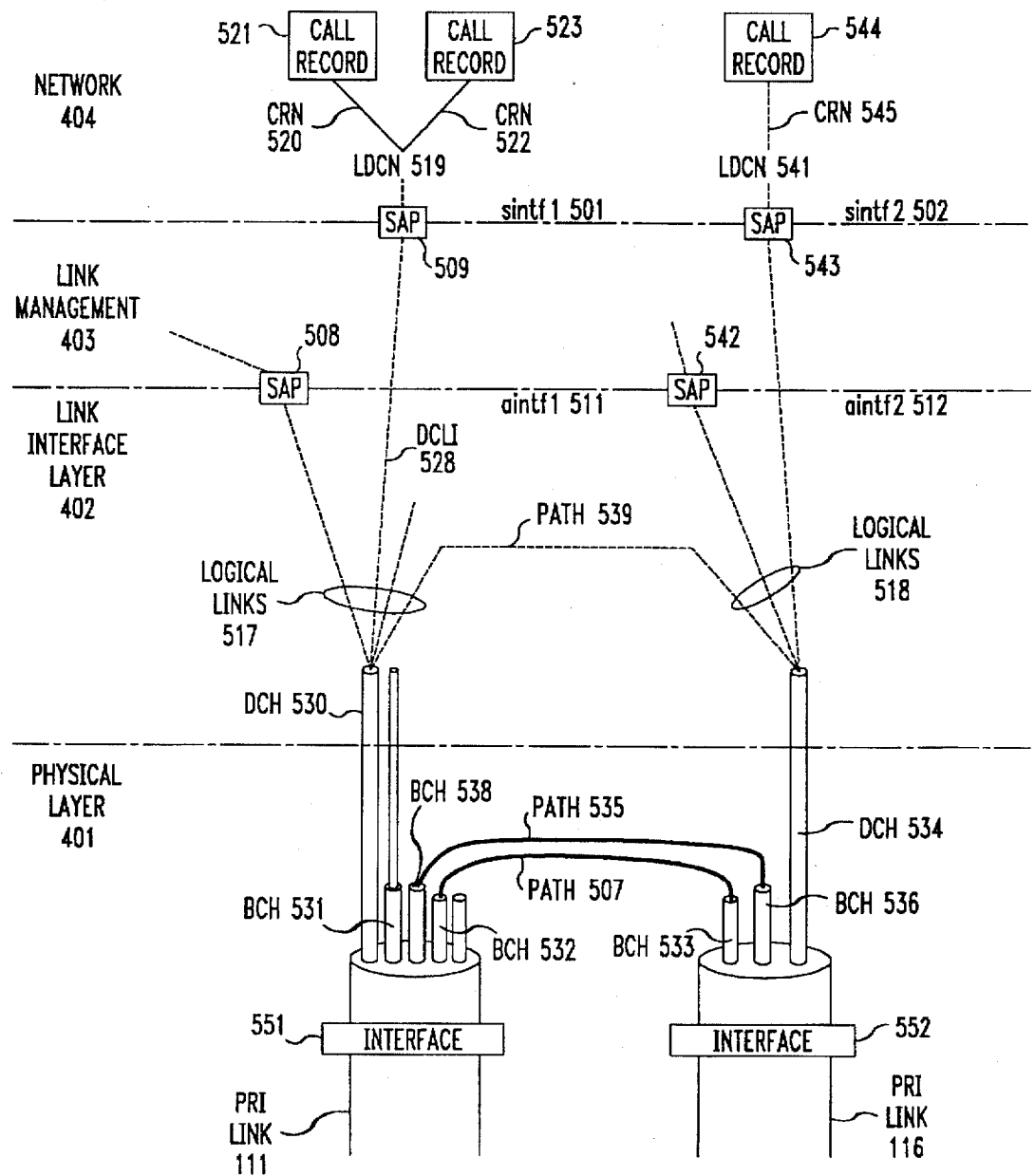
FIG. 5 logically illustrates the signaling and transport paths that are set up within a switch node.

FIG. 5 logically illustrates the general relationships between data link connection identifiers (DLCI), service access point identifiers (SAPI), terminal end identifiers (TEI), system interface numbers (sintf), switches angel interface numbers (aintf), logical D channel numbers (LDCN), call reference numbers (CRN), and the various software layers. As illustrated in FIG. 5, the pair of link interface layers and physical layers are implemented on an angel. (The concept of angels is explained in U.S. Pat. No. 5,386,466.) Link interface layer 402 and physical layer 401 are implemented by a local angel. A node processor in switch node 102 implements link management 403, network 404, and higher layers. The node processor provides overall control of switch node 102. Sintf, switch and aintf numbers correlate to physical interfaces. The sintf numbers are utilized by network software layer 404 and higher software layers to identify physical interfaces. In addition, two switching nodes, interconnected by a link that is terminated on both ends by a physical interface, negotiate a logical interface number for the link during initialization of the link.

When a transport message is received, network layer 404 converts the logical interface numbers in the channel identification IEs to sintf's. Network layer 404 views the physical interfaces as being identified by sintf1 501 and 502. Link management 403 makes a conversion between the sintf numbers and the switch and aintf numbers which together represent the physical interface. For example, link management 403 converts sintf1 501 to the local angel and aintf 511. Link interface layer 402 utilizes aintf 1511 to identify physical interface 551. There is a one for one correspondence between sintf1 501 and sintf2 502 and aintf1 511 and aintf2 512.

The sintf and aintf numbers identify specific interfaces, and each interface has a number of channels. For example, PRI interfaces 551 and 552 each have 24 channels. Network layer 404 identifies the channels associated with a particular sintf by using the actual physical channel numbers, and similarly, link interface layer 402 utilizes the physical channel numbers in association with an aintf number. This is possible because the specifications of the ISDN standard designate that physical channel 24 is used to perform signaling. Network layer 404 and higher layers utilize sintf numbers in order to control the link interface layers and physical layers to interconnect physical channels and to create specific protocols on these channels. The manner in which B channels are interconnected through physical networks such as network 515 is not illustrated in FIG. 5 except in a logical manner, e.g. path 507.

Further, FIG. 5 logically illustrates the utilization of the various channels and the points at which these channels are terminated and at which information is utililized. B channel 532 of interface 551 is interconnected to B channel 533 of interface 552 by path 507. Path 507 is made through a network internal to a switch node. It would be obvious to one skilled in the art that similar paths could be made between B channels in interface 551 and 552. The circuit switching of B channels is performed at the physical layer; whereas, packet switching or frame relaying is performed at the link interface layer. Greater detail on operations of the layers of FIGS. 5 and 6 in setting up a call are set forth in U.S. Pat. No. 5,386,466.

This section describes the transport messages from the prospective of applications software layer 409, session software layer 406, transport software layer 405, and network software layer 404 through switch node 102. To clarify the explanation, first a brief description is given of how a call is initially set up through switch node 102.

Figure 6:
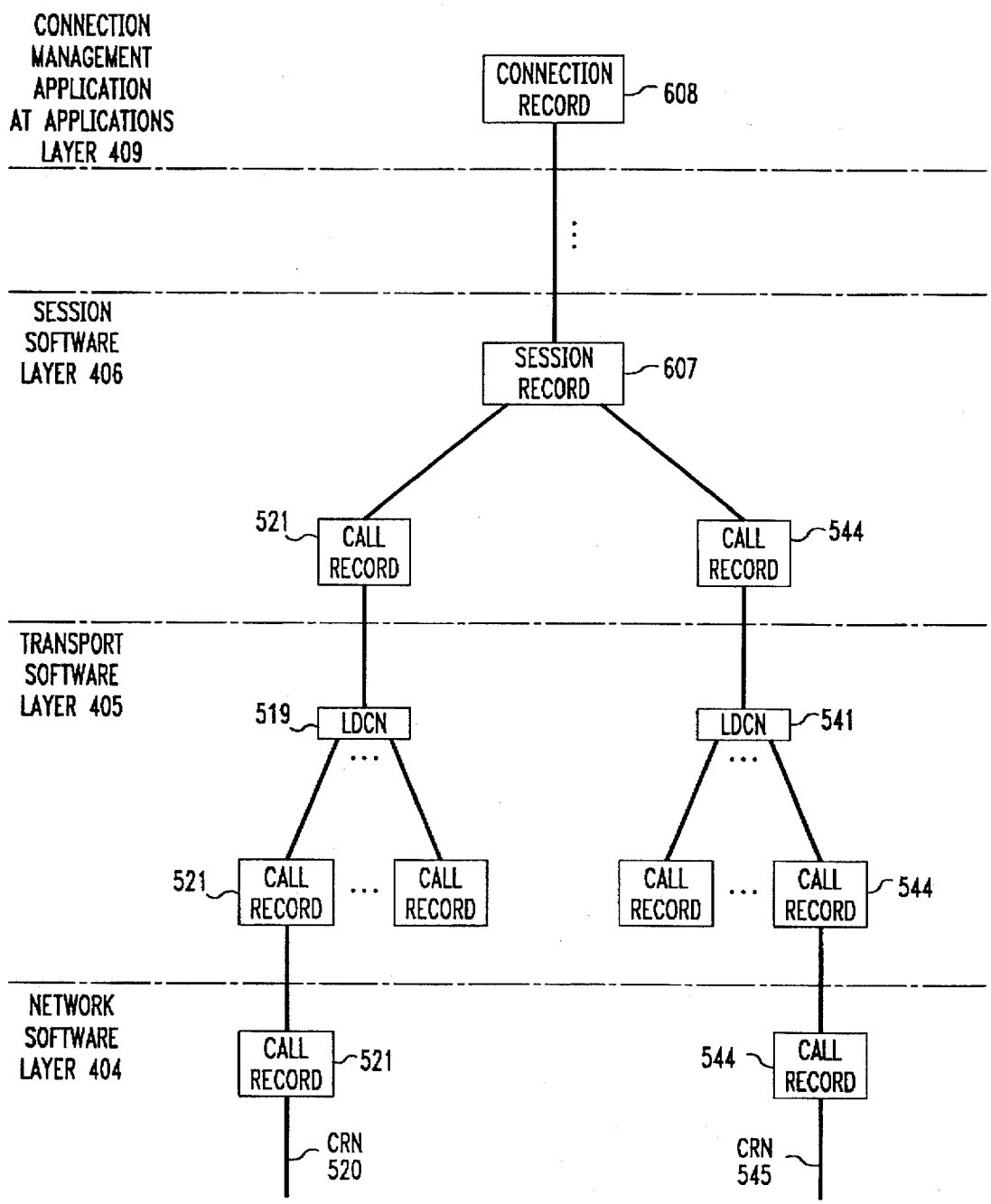
FIG. 6 illustrates the logical structure of a call through the network, transport, session, and application software layers.

FIG. 6 illustrates the manner in which calls are identified and processed between network software layer 404, transport software layer 405, session software layer 406, and applications software layer 409. Switching node 102 is executing these software layers. At network software layer 404, each half of a call is identified by the CRN number, e.g. CRN 520, and a call record, e.g., call record 521, as previously described with respect to FIG. 5. As can be seen from FIG. 6, the call record is common throughout the software layers, and each layer uses additional information along with the call record. The call records are taken from a common table within each switching node, and a call record number is unique within a particular switching node.

Transport software layer 405 identifies each half of a call by the LDCN and call record number. The LDCN is utilized because the information illustrated in the level 4 routing tables is identified by the LDCN number which denotes the link (or set of links) out of a switching node to another switching node. Notice that the call record is identified identically at all three software layers as illustrated in FIG. 6 for a particular call. Session software layer 406 is the point within the software architecture where halfs of calls are joined together for purposes of exchanging signal information by each call having a unique session record set up for it such as session 607. The session record is associated with two call records such as call record 521 and call record 544 with each call record representing half of a call. (Each half of a call is referred to as a "half call".) An exception to this rule is if the call is to an application. In that case, only one call record is utilized since the other half of the call terminates at the application software layer.

To understand how calls are processed by the three software layers illustrated in FIG. 6, first consider the example of setting up a call through switch node 102. For this example, reference must be made to FIG. 5 which illustrates the interfaces associated with call records 521 and 544. Call record 521 is associated with PRI link 111, and call record 544 is associated with PRI link 116 in the following example.

Assume that a call is being placed from communication terminal 101 to communication terminal 104 via switching node 102. LDCN 541 is associated with PRI 116 which interconnects switching node 102 to switching node 103 as illustrated in FIG. 1. Further, assume that the node number in the setup messages designates communication terminal 104. (The manner in which routing decisions are made in switch node 102 for a call from communication terminal 101 to communication terminal 104 is set forth in U.S. Pat. No. 5,386,466.) When the setup message is received from communication terminal 101 via PRI link 111, network software layer 404 generates a setup indication which is communicated to transport software layer 405 and establishes call record 521 which starts the setting up of the first half call. Transport software layer 405 examines the node number and determines that switching node 102 is not the destination switching node; hence, layer 406 does not set a node flag. If the node flag was set, this indicates that the call terminates on switch node 102. The dialed number along with the node flag is communicated to session software layer 406 which, because the node flag is not set, does not attempt to route a call based on the dialed number. Since in the present example the node flag is not set, session software layer 406 establishes session record 607 and call record 544 is selected which starts the setting up of the second half call. The node and the call record number are then communicated to transport software layer 405 as a setup request. Transport software layer 405 interrogates the level 4 routing table and determines that LDCN 541 is a path to communication terminal 104. Transport software layer 405 then associates call record 544 with LDCN 541 and transmits the setup request to network software layer 404 which then establishes communication with switching node 103 via PRI link 116.

After switch node 102 has sent a setup message to switch node 103 via PRI link 116, the network software layer of switch node 103 responds with a call proceeding. Network software layer 404 is responsive to the call proceeding message to notify a connection management application that it should establish the connection through switch node 102 switching network to interconnect B channel 532 and B channel 533 so as to establish path 507. Session record 607 points to connection record 608. Connection record 608 is maintained by the connection management application which is executing at applications layer 409. The connection management application is responsive to the message from network software layer 404 to establish this connection and to enter into connection record 607 the parameters of the internal connection.

To further understand how the transport messages are utilized to increase or decrease bandwidth through switch node 102, consider the following example. Assume that the setup message that was described in the previous paragraph setup a voice connection through switch node 102 which resulted in path 507 of FIG. 5 being set up through the switching network of switch node 102. Next, communication terminal 101 requests that a packet switch connection be established on D channel 530 and that a 64 Kb data channel be established on channel 538 by using a transport message.

In order to establish the additional bandwidth necessary for the data link executing the LAPF protocol and a data channel having 64 Kbs, communication terminal 101 transmits to switch node 102 a transport message that has the following information. Call reference IE 302 is set equal to CRN 520 of FIGS. 5 and 6, message type IE 303 is set equal to TRANS. Repeat indicator IE 304 is set to add bandwidth. Bearer capability IEs 305 are as follows. The first bearer capability IE specifies a packet data link using the LAPD protocol, and the second IE is set equal to a circuit data link with 64 Kbs of bandwidth. Channel identification IEs 306 are as follows. The first IE specifies interface 551 utilizing the logical interface number, and specifies the use of D channel 530. The second IE of the channel identification IEs 306 specifies interface 551 and B channel 538. A single data link identification IE 307 follows and specifies that one of the logical links 517 is to be used for packet data. Lower layer capability IE 308 specifies the proprietary protocol that communication terminal 104 is to implement with respect to the 64 Kb data channel. Higher layer compatibility IE 309 specifies that the X400 email protocol standard is being implemented. This transport message is received and disassembled by network software layer 404 of FIG. 6. If network software layer 404 is capable of providing the requested transport capabilities, network transport layer 404 responds with a transport acknowledge message that contains only IEs 311, 312, 313, and 319. If network 404 cannot provide one of the requested transport capabilities, it identifies the particular transport capability that could not be provided in IEs 315, 316, and 317, and indicates in the repeat indicator 314 that this particular transport capability must be deleted. In addition, the transport acknowledge message could also indicate using another bearer capability, channel identification, and data link identification IEs, as an alternative to what had been requested.

In the present example, network software layer 404 can provide the requested transport capabilities. Network software layer 404 then transmits to session software layer 406 via LDCN 519 of transport software layer 405 the request to add transport capabilities. Session software layer 406 utilizes session record 607 to call record 544 to determine that the call utilizes LDCN 541 and uses LDCN 541 to notify network software layer 404 that additional work is to be done with respect to call record 544.

Returning for a moment to the left half of the call that is illustrated by call record 521 and LDCN 519 of FIG. 6. Network software layer 404 transmits to the connection management application the new parameters that have been added to the connection identified by call record 521. The connection management application is responsive to this information to store the additional connection information in connection record 608.

In the right half of the call that is identified by call record 544 and LDCN 541, network software layer 404 is responsive to the bearer capability IEs of the message that has been received from communication terminal 101 to determine which transport facilities should be utilized to meet the requirements of these bearer capability IEs. As illustrated in FIG. 5, network software layer 404 utilizes one of the logical links of logical links 518 to provide the data link utilizing the LAPD protocol and B channel 536 to provide the capabilities of the 64 Kb data channel. Note, if network software layer 404 had available a B channel which had been subdivided into logical links, network software layer 404 could have used one of these logical links for the data link executing the LAPF protocol. Network software layer 404 now forms a new transport message that includes the bearer capability IEs that are identical to those received from communication terminal 101 and channel identification IEs 306 and data link identification IEs 307 that are specific to the transport capabilities being utilized with interface 552. The lower layer compatibility IEs 308 and higher layer compatibility IEs 309 are simply transported up the left half of the call to session software layer 406 which then transmits them down the right half of the call where they are assembled into the new transport message by network software layer 404. Network software layer 404 then transmits the transport message to its peer network software layer in switch node 103.

In our present example, the network software layer in switch node 103 accepts all of the transport capabilities requested in the transport message. The network software layer in switch node 103 responds with a transport acknowledge message which contains no IEs 315, 316, or 317. Network software layer 404 in switch node 102 is responsive to this transport acknowledge message to transmit to the connection management application in application layers 409 of FIG. 6 the parameters for the left half of the call so that these can be stored in the connection record 608. The connection management application is also responsive to this information to control the switching network of switch node 102 to setup path 535. In addition, connection management application transmits a message to link interface layer 402 to setup path 539.

At this point, paths 507, 535, and 539 are set up through switch node 102. In the present example, when switch node 103 attempts to establish the original transport capabilities, communication terminal 104 is unable to provide the data link utilizing the LAPD protocol. The result is that switch node 103 in the left half of the call which is similar to that illustrated in FIG. 6 has recorded in its connection record the voice bandwidth, the data link using LAPD protocol, and the 64 Kb data channel. However, in the connection record for the right half of the call, only the voice call and the 64 Kb data link are recorded. Upon receiving the transport complete message from communication terminal 104, via network software layer, the connection management application in switch node 103 only connects the 64 Kb data link. Note, that the voice call connection was made during the setup process. Communication terminal 104 then transmits a transport complete message that identifies the bearer capability, channel identification IEs, and data link identification IEs that are in use. This message is received by switch node 103 and is transferred up the right half of the call through the software layers to session software layer 406 of switch node 103 which communicates it down the left half of the call to network software layer 404 of switch node 103. Network software layer 404 eliminates the data link capabilities and informs the connection management application that the data link is no longer being utilized. In response, connection management application of switch node 103 eliminates the data link information from connection record of switch node 103. Network software layer 404 in switch node 103 then assembles a transport complete message that details the fact that only the 64 Kb data link has been set up and transmits this transport complete message to switch node 102.

When network software layer 404 of switch node 102 receives the transport complete message from switch node 103, it informs the connection management application that path 539 is to be eliminated. The connection management application then eliminates from connection record 608 reference to the data link executing the LAPD protocol. Network layer 404 then transmits the transport complete message through session software layer 406 down into the left half of the call. Network software layer 404 is responsive to this transport complete message to notify the connection management application to eliminate the reference to the data link executing the LAPD protocol from connection record 608. The connection management application also transmits a message to link interface layer 402 to remove path 539. In the left half of the call, network software layer 404 then assembles another transport complete message for transmission to communication terminal 101.

At a later point in time, communication terminal 101 determines that the 64 Kb data link is no longer required, communication terminal 101 transmits a transport message where repeat indicator 304 is set equal to remove and the bearer capability IEs 305, channel identification IEs 306, and data link identification IEs 307 specify that the 64 Kb data link is to be removed. Switch node 102 then repeats this message and sends it to switch node 103. Upon receiving the transfer acknowledge message back from switch node 103, network software layer 404 requests that the connection management application remove path 535. In addition, connection management application updates the connection record 608 as requested by network software layer 404. When the transport message requesting the removal of the data link is received by communication terminal 104, it responds with a transport complete message that specifies that this removal should have taken place.

Returning now to when communication terminal 104 received the transport message that set up the 64 Kb data channel, communication terminal 104 responds in a similar manner with respect to IEs 305 through 307 as the other switch nodes did. The termination point of a call is a terminal management application that is executed in applications level 409 of FIG. 4. Greater details on functions of a terminal management application are given in U.S. Pat. No. 5,182,751 and U.S. Pat. No. 5,386,466. Briefly, a terminal management application provides all of the control functions required to terminate a call and to allow the terminal to utilize the communicated data. A terminal management application can be executed on a switch node whereby the majority of the terminal control functions are done in the switch node rather than within the communication terminal. On the other hand, a communication terminal, such as communication terminal 101, does have its own computer and is executing the software structure illustrated in FIG. 4. In this case, the terminal management application is executing on the terminal. As illustrated in FIG. 1, communication terminal 101 is then the termination point of the call. However, with a different type of communication terminal being utilized for communication terminal 101, the terminal management application could be executing in switch node 102 which would be the termination point of the call.

When the transport message was received to set up the 64 Kb data channel, this message was transported to the terminal management application at applications level 409. The terminal management application then requested that the connection manager request that link interface layer 402 implement the proprietary protocol that is defined in the low layer compatibility IEs 308 so that the link interface layer can properly use the low level proprietary protocol. In addition, the connection manager application instructs the presentation layer 407 of communication terminal 104 to implement the X400 email standard as defined in by the higher layer compatibility IE 309.

Figure 7:
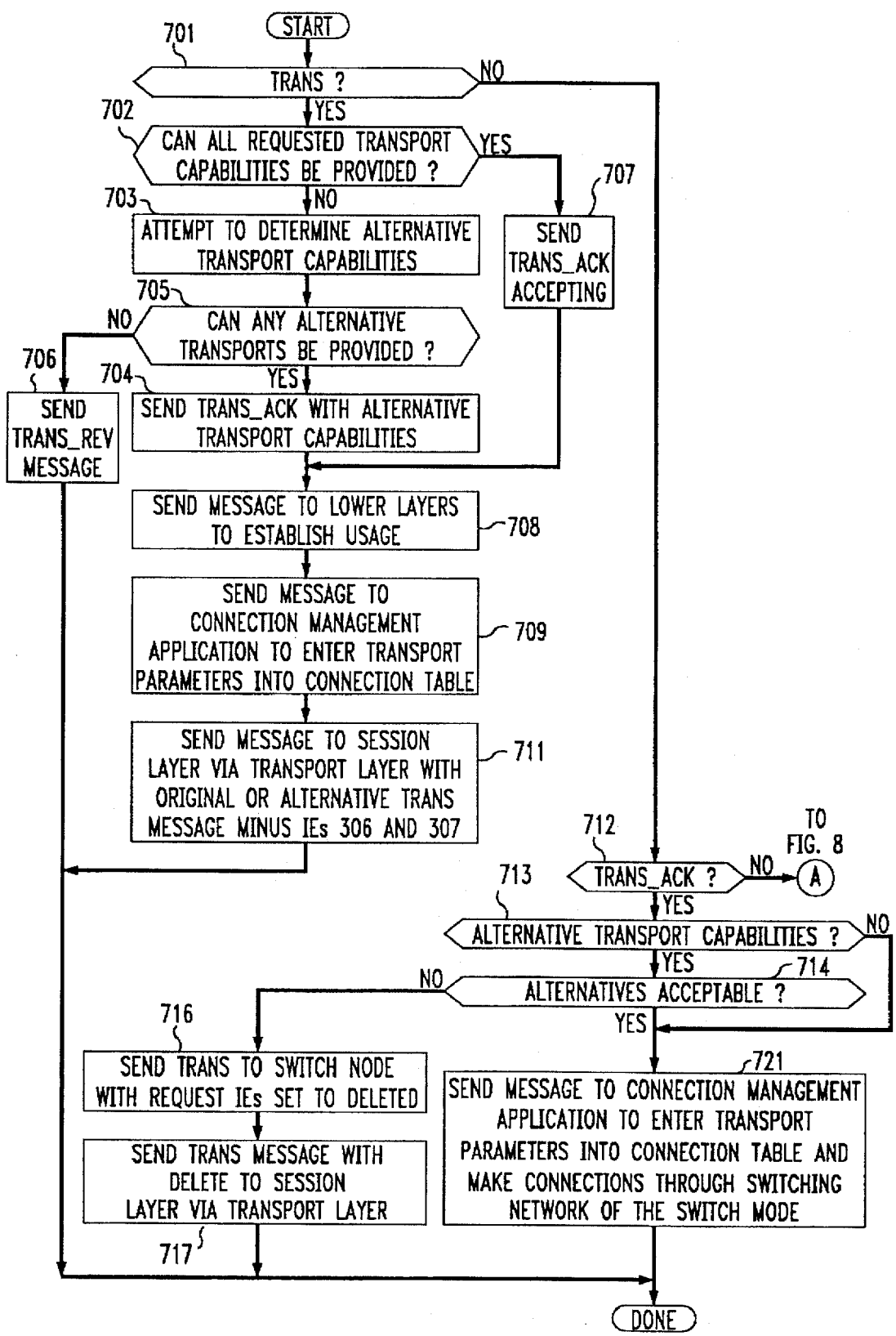
FIGS. 7, 8, and 9 illustrate, in flow chart form, the response of a network layer to the transport messages.
Figure 8:
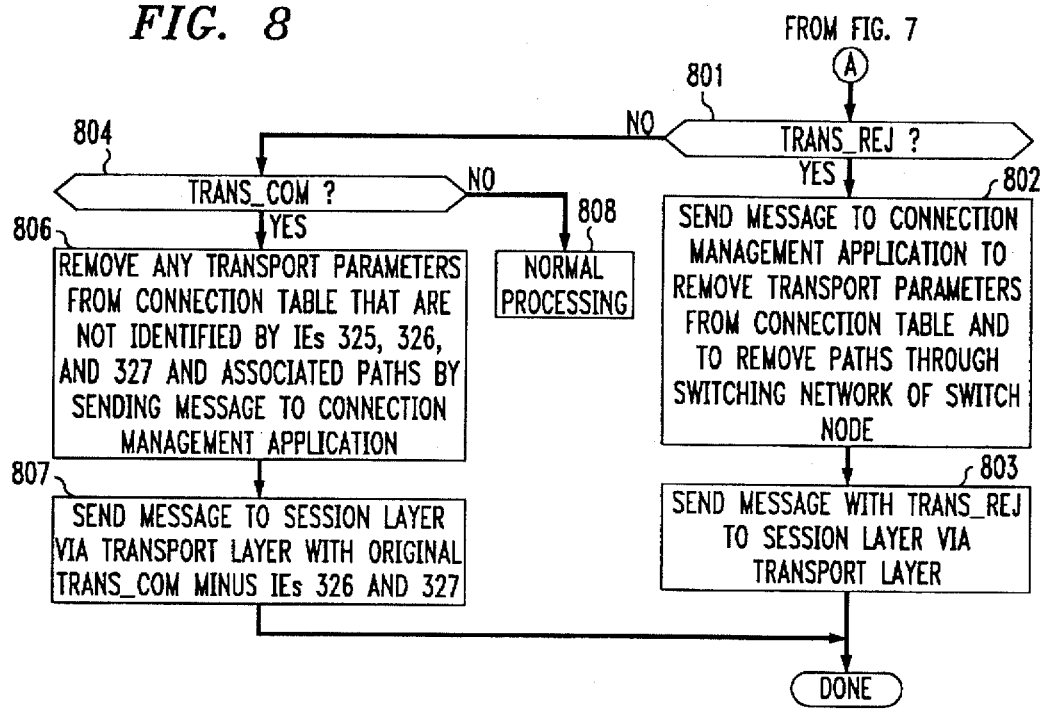
Figure 9:
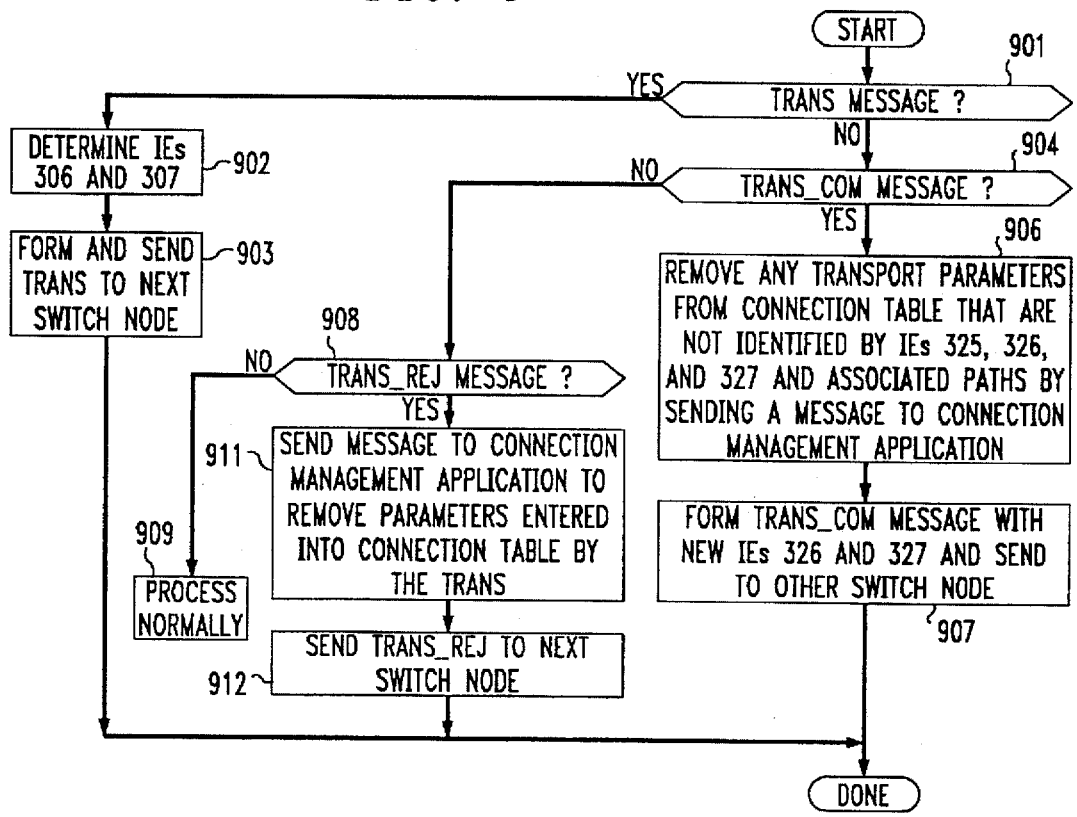

FIGS. 7, 8, and 9 illustrate, in flowchart form, the operations performed by network software layer 404 in implementing the transport messages illustrated in FIG. 3. Network software layer 404 performs the majority of the work in implementing the transport messages. FIGS. 7 and 8 illustrate the responses of network layer 404 upon receiving a transport message from another switching node. FIG. 9 illustrates the responses of network software layer 404 upon receiving a transport message from the session layer 406. The convention used in these figures is that that transport messages being received or sent to another switch node are identified only by their message code, e.g., TRANS. On the other hand, transport messages being relayed by session software layer 406 from the other half of the call are designated by the message code and the word "message", e.g., TRANS message.

Decision block 701 of FIG. 7 determines whether a TRANS message has been received from another switch node. In the previous example, switch node 102 receives a TRANS message via interface 551 from communication terminal 101. If the answer in decision block 701 is yes, decision block 702 determines whether the requested transport capabilities that are defined by bearer capability IEs 305, channel identification IEs 306, and data link identification IEs 307 can be provided. If the transport capabilities can be provided, block 707 is executed which sends back a TRANS_ACK message that contains no IEs 315, 316, and 317. If the answer in decision block 702 is no, block 703 attempts to determine an alternative transport capability. If none of the transport capabilities can be provided, a TRANS_REJ message is sent and all further processing is terminated. If at least one original or alternative transport capability can be provided, a TRANS_ACJ message is returned with the modified list of transport capabilities. Next, block 709 sends a message to the connection management application at applications layer 409 requesting that the transport parameters as defined by the new transport capabilities be entered into connection table 608. The transport parameters entered are either those of the originally requested transport capabilities or the alternative transport capabilities or the resulting combination of the two. Finally, block 711 sends a TRANS message to session layer 406 via transport layer 405 which is the original TRANS message and/or alternative transport capabilities minus IEs 306 and 307. IEs 306 and 307 are unique to the left half of the call as illustrated in FIG. 6. Session software layer 406 is responsive to this message to identify the call record, to identify LDCN associated with the right half of the call, and to send the message down the right half of the call with the proper identification to network software layer 404.

Returning to decision block 701, if the answer is no, control is transferred to decision block 712 which determines if a TRANS_ACK message was received from another switch node. In the previous example, a TRANS_ACK message was received by switch node 102 from switch node 103 on interface 552. This TRANS_ACK message was received by the right half of the call. If the answer in decision block 712 is yes, control is transferred to decision block 713. The latter decision block determines if there are alternative transport capabilities in the transport acknowledge message. If the answer is yes, control is transferred to decision block 714 which determines if the alternative transport capabilities are acceptable, i.e., the switch node can provide the alternative transport capabilities. If the answer in decision block 714 is no, block 716 is executed which sends a TRANS message to the other switch node with a request to delete any transport capabilities that are not acceptable. Next, block 717 sends a TRANS message with the same delete request included to session software layer 406 via transport layer 405. Session layer 406 is responsive to that message to transport the message down the left half of the call to network software layer 404. Note, that the transport parameters are only inserted into the connection record and paths established within a switch node upon reception of an acceptable TRANS_ACK message.

Returning to decision blocks 713 and 714. If the answer in decision block 713 is no, or the answer in decision block 714 is yes, control is transferred to block 721 which sends a message to the connection management application to enter the transport parameters into the connection table and to make the connections through the internal switching network of the switch node.

Returning to decision block 712, if the message is not a TRANS_ACK message, control is transferred to decision block 801 of FIG. 8 which determines if the message is a TRANS_REJ message. If the answer in decision block 801 is yes, block 802 sends a message to the connection management application to remove the transport parameters from the connection table and to remove any paths having been set up for those transport parameters through the switching network of the switch node. Note, that there may not be any work for the connection management application to do if the TRANS_REJ message is received in place of a TRANS_ACK. After execution of block 802, block 803 sets a message containing the TRANS_REJ message to session layer 406 via transport layer 405. Session software layer 406 sends this message down the left half of the call with the proper call record and LDCN identification information to network software layer 404.

If the answer in decision block 801 is no, control is transferred to decision block 804 which determines if the message is a TRANS_COM message. If the answer is no, control is transfered to block 808 which provides normal processing. Block 808 handles the standard ISDN messages. If the answer is yes in decision block 804, block 806 determines which transport parameters that are in connection table 608 are not identified by the bearer capability IEs 325, channel identification IEs 326, and data link identification IEs 327. After identifying these transport parameters, block 806 transmits a message to the connection management application to remove these transport parameters and any associated paths. Finally, block 807 sends a message to session software layer 406 via transport software layer 405 that contains the original TRANS_COM minus the channel identification IE 326 and the data link identification IE 327. Session software layer 406 is responsive to that message communicated down the left half of the call to network software layer 404 with the call record and LDCN identification information.

FIG. 9 illustrates the operations performed by network software layer 404 in response to transport messages being received from session software layer 406. Decision block 901 determines if the message is a TRANS message. In the previous example, the right half of the call illustrated in FIG. 6 receives a TRANS message from session software layer 406 after the left half of the call had received that message from communication terminal 101 via interface 551. If the answer is yes in decision block 901, control is transferred to block 902. Block 902 is responsive to the bearer capability IEs 305 to determine what the new channel identification IE 306 and data link identification IEs 307 should be for the TRANS message that will be transmitted to the next switch node. After this determination is made, block 903 forms and sends the new TRANS message to the next switch node. Note, that elements 301, 302, 303, 304, 305, and 308, 309, and 341 are simply repeated in the new TRANS message.

If the answer in decision block 901 was no, decision block 904 determines if the message received from session software layer 406 is a TRANS_COM message. If the answer in decision block 904 is yes, decision block 906 determines the transport parameters that are in connection table 608 that are not identified in bearer capability IEs 325, channel identification IEs 3216, and data link identification IE 327. After determining these transport parameters, block 906 transmits a message to the connection management application requesting that these transport parameters be removed from the connection table 608 and that all associated paths be removed. Next, block 907 forms a TRANS_COM message with new channel identification IEs 326 and data link identification IEs 327 that define the transport capabilities on the left half of the call. Block 907 then sends the formed TRANS_COM message to the other switch node.

If the answer in decision block 904 is no, control is transferred to decision block 908 which determines if a TRANS_REJ message was received from session software layer 406. If the answer is no, control is transferred to block 909 for normal processing of standard ISDN messages. If the answer in decision block 908 is yes, block 911 sends a message to the connection management application to remove all parameters entered into connection table 608 by the associated TRANS message. Finally, block 912 sends a TRANS_REJ message to the next switch node. In the previous example, block 912 sends the TRANS_REJ message from switch node 102 to communication terminal 101.

Figure 10:
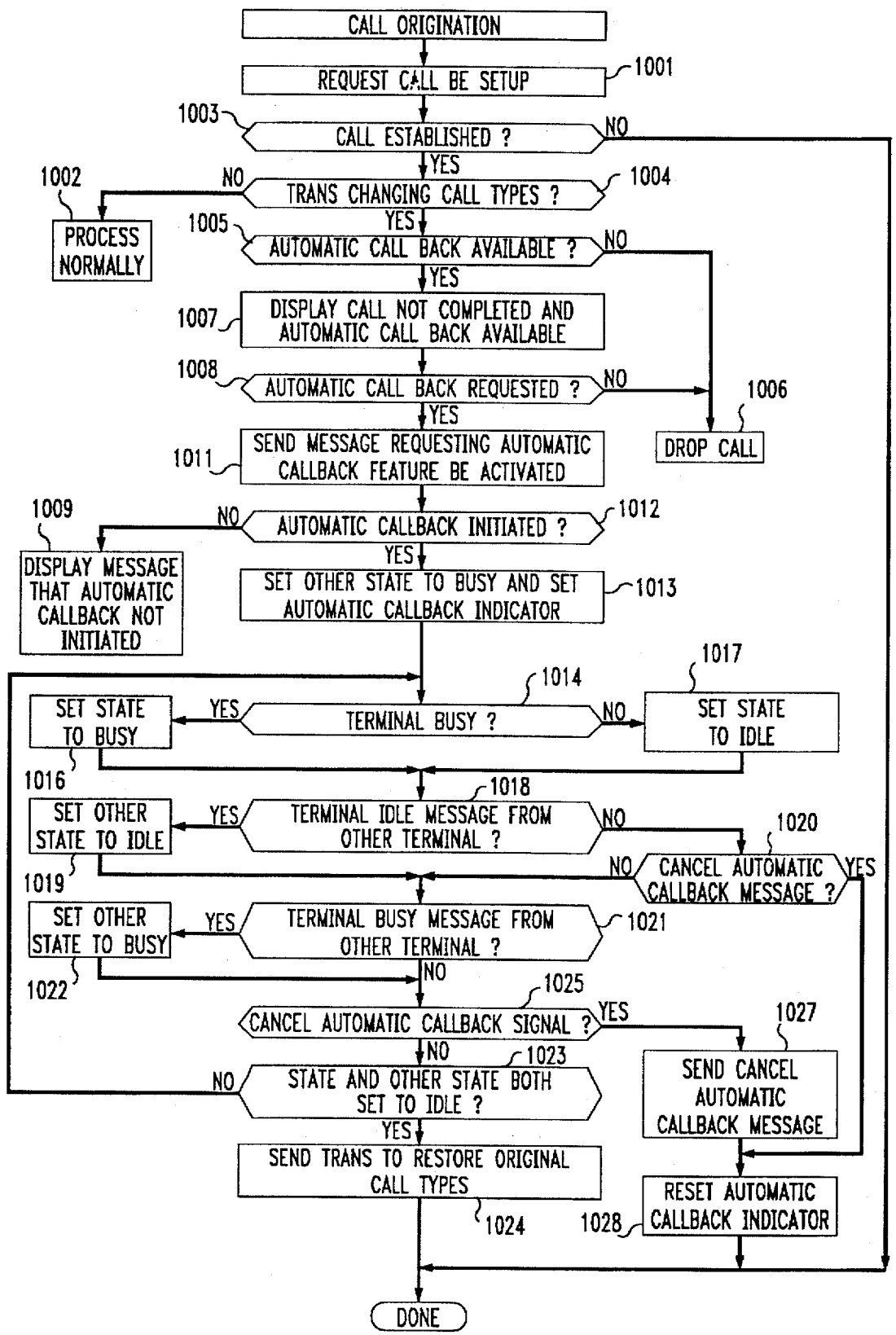
FIGS. 10 and 11 illustrate, in flow chart form, operations performed by a communication terminal in providing automatic call back.
Figure 11:
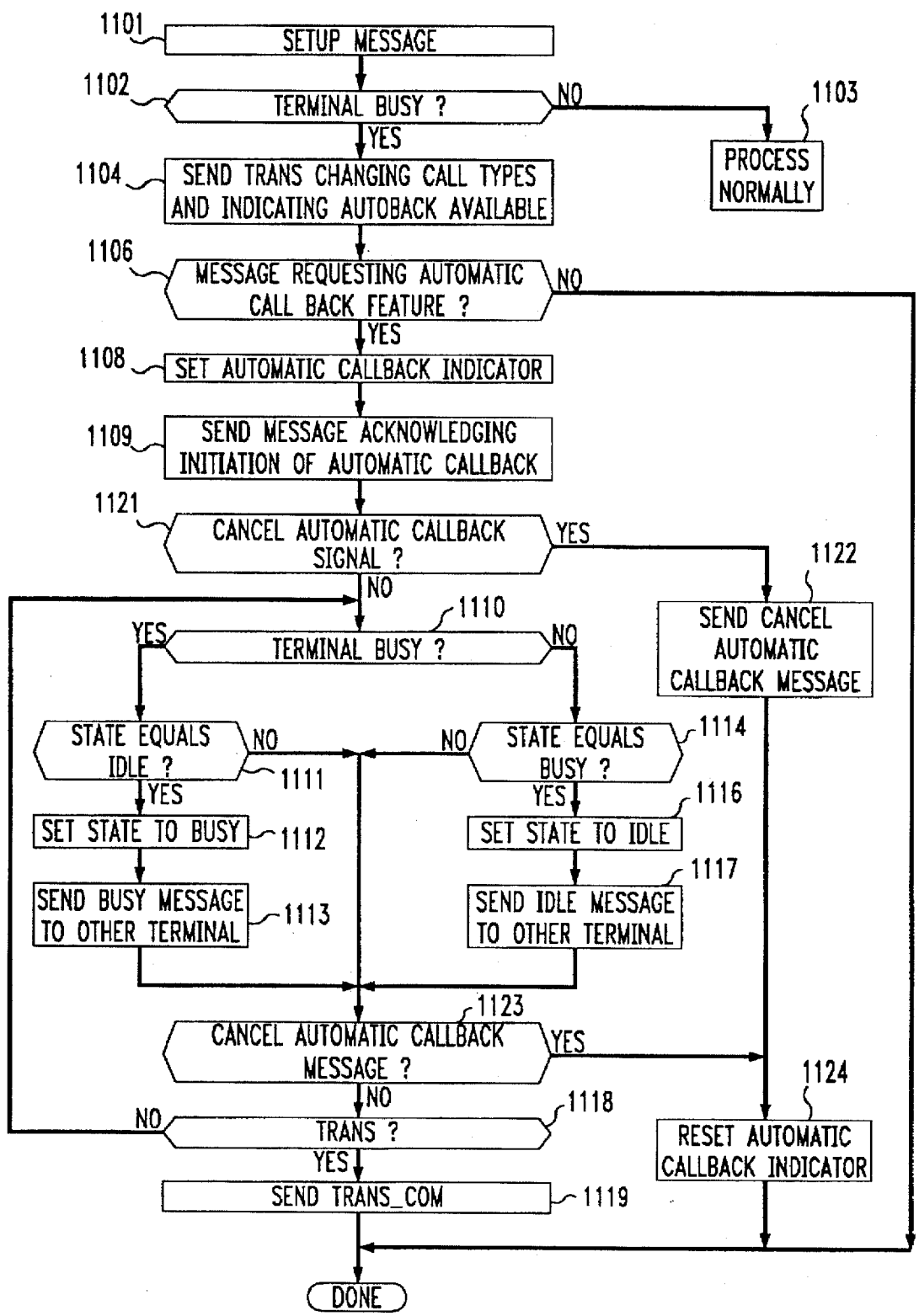

FIG. 10 illustrates, in flow chart form, the operations performed by a communication terminal initiating the automatic call back feature. FIG. 11 illustrates, in flow chart form, the operations performed by the other communication terminal that is part of the automatic call back feature. Upon call origination, block 1001 requests a call be set up with the designated communication terminal, decision block 1003 then determines if the requested call has been established or not. If the answer is no in decision block 1003, processing is finished. If the call has been established, decision block 1004 determines if a TRANS message was received that changed the call types. Call types is used here to mean for example, a video call. If the answer in decision block 1004 is no, block 1002 is executed for normal processing.

If the answer in decision block 1004 is yes, decision block 1005 determines from the display IE of the TRANS message if automatic call back is available at the called communication terminal. If the answer is no, block 1006 drops the call. If the answer in decision block 1005 is yes, block 1007 displays to the user that the call has not been completed but that automatic call back is available. Decision block 1008 then determines if the user wishes to initiate the automatic call back feature. If the answer is no, block 1006 drops the call. If the answer in decision block 1008 is yes, block 1011 sends a message to the other communication terminal requesting that the automatic call back feature be activated. Decision block 1012 then waits for a message from the other communication terminal defining whether the automatic call back feature has been initiated or not. If the answer is no, block 1009 displays a message to the user that the automatic call back feature has not been initiated and drops the call. If the answer is yes in decision block 1012, block 1013 sets the other state to busy.

In FIG. 10, two variables are used to determine whether the two terminals are busy or not. The "state" variable is used to denote whether the terminal executing FIG. 10 is busy; whereas, the "other state" variable is utilized to reflect whether the other communication terminal is busy or idle. Blocks 1014 through 1028 determine when both terminals are idle so that the call can be restored to the original call types or that the call is to be abandoned. Decision block 1014 determines whether the terminal executing FIG. 10 is busy. If the answer is yes, block 1016 sets state to busy. If the answer is no, block 1017 sets state to idle. After execution of either blocks 1016 or 1017, decision block 1018 is executed to determine if a terminal idle message has been received from the other communication terminal. If the answer is yes, block 1019 sets other state to idle; whereas, if the answer is no, decision block 1020 determines if a cancel automatic call back message had been received. If the answer in decision block 1020 is yes, block 1028 is executed which resets automatic call back indicator. Note, that the other communication terminal would have dropped the call. If the answer in decision block 1020 is no, decision block 1021 determines if a terminal busy message was received from the other terminal. If the answer is yes, block 1022 sets the other state to busy.

Next, decision block 1025 is executed to determine if a cancel automatic call back signal has been received from the communication terminal executing FIG. 10. If the answer is yes, block 1027 sends a cancel automatic call back message to the other communication terminal and drops the call before transferring control to block 1028. If the answer in decision block 1025 is no, then decision block 1023 determines if both state and other state are set equal to idle. If the answer is no, control is transferred back to decision block 1014. If the answer is yes in decision block 1023, block 1024 sends a TRANS message to restore the original call types. Note, that block 1024 assumes that a TRANS_COM message was received back from the other communication terminal.

FIG. 11 illustrates the operations performed by the other communication terminal. Block 1101 detects a setup message. Decision block 1102 determines if the communication terminal executing FIG. 1 is busy. If the answer is no, control is transferred to block 1003 for normal processing. If the answer in decision block 1102 is yes, block 1104 sends a TRANS message changing the call types and indicating that the automatic call back feature is available. Next, decision block 1106 determines if a message requesting the initiation of the automatic call back feature is received. If the answer is no, then normal processing is done since the other communication terminal would have dropped the call. If the answer is yes in decision block 1106, block 1108 sets the automatic call back indicator before transferring control to block 1109. Block 1109 sends a message acknowledging the initiation of the automatic call back feature.

Blocks 1121 through 1124 determine when the call is to be dropped or has been reestablished to the original call types. Decision block 1121 determines if a cancel automatic call back signal has been received from the communication terminal executing FIG. 11. If the answer is yes, block 1122 sends a cancel automatic call back message to the other communication terminal and drops the call. Block 1124 resets the automatic call back indicator. If the answer in decision block 1121 is no, decision block 1110 determines if the communication terminal is busy. If the answer is yes, decision block 1111 determines if the state variable equals idle. If the answer is yes, block 1112 sets state to busy, and block 1113 sends a busy message to the other communication terminal. Regardless of whether decision block 1111 was yes or no, control is eventually transferred to decision block 1123.

Returning to decision block 1110, if the answer is no, decision block 1114 determines if the state equals busy. If the answer is yes, block 1116 sets state to idle, and block 1117 sends an idle message to the other communication terminal. After execution of block 1117, control is transferred to decision block 1123.

Decision block 1123 determines if a cancel automatic call back message was received from the other terminal. If the answer is yes, control is transferred to block 1124 which resets the automatic call back indicator. If the answer in decision block 1123 is no, decision block 1118 determines if a TRANS message was received. If the answer is no, control is transferred back to decision block 1110. If the answer is yes, block 1119 sends a TRANS_COM message to the other communication terminal. Block 1118 assumes that the received TRANS message restored the original call types. One skilled in the art could readily envision additional operations to verify this fact.

Figure 12:
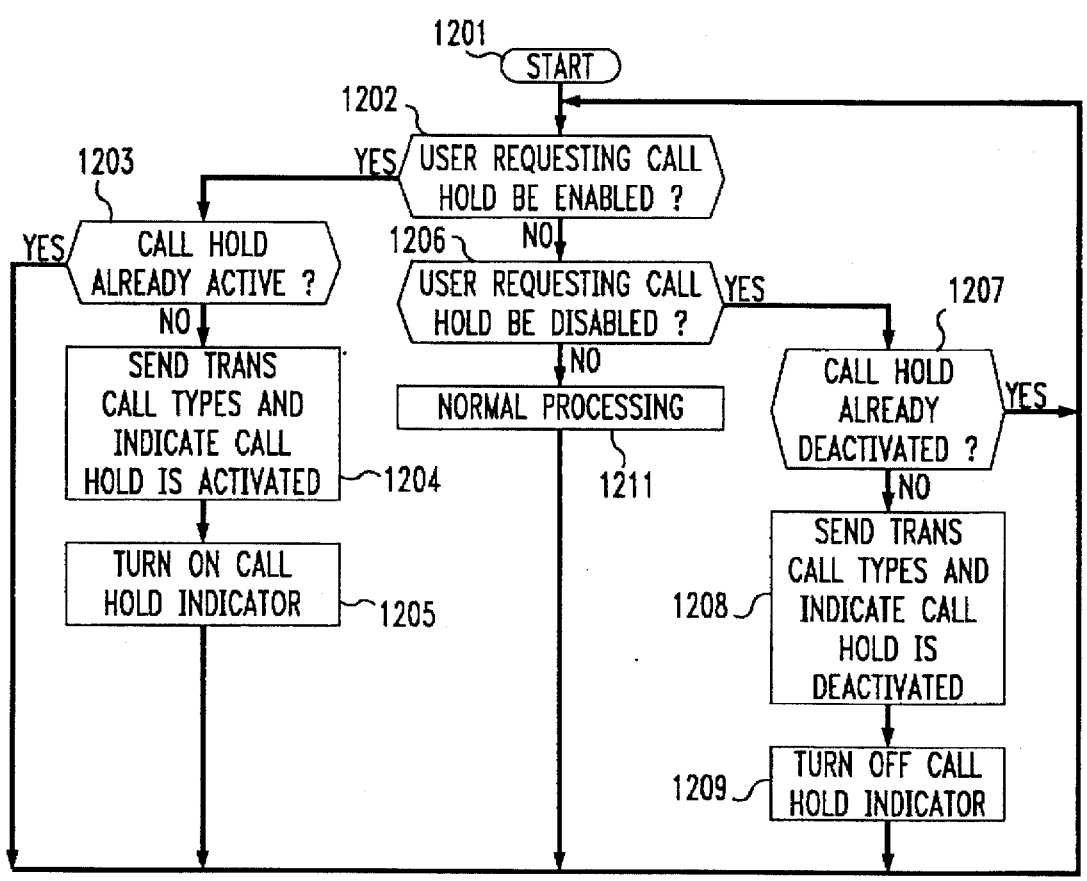
FIG. 12 illustrates, in flow chart form, operations performed by a communication terminal in providing call hold.

FIG. 12 illustrates the operations performed by a communication terminal executing the call hold feature. Block 1201 starts the process. Decision block 1202 determines if the user is requesting call hold enabled. This request would be done by the user actuating a call hold button or by using a cursor to select a call hold field on a CRT screen. If the answer is yes in decision block 1202, block 1203 determines if call hold is already active. If the answer is yes, control is transferred back to decision block 1202. If the answer is no in decision block 1203, block 1204 sends a TRANS message to the other terminal changing the bandwidth of the call to that of a low speed data link and indicating to the other communication terminal that call hold is activated. Block 1205 then turns on the call hold indicator on the communication terminal executing FIG. 12.

Returning to decision block 1202, if the answer is no, decision block 1206 determines if the user is requesting that call hold be disabled. If the answer is no in decision block 1206, block 1211 performs normal processing. If the answer is yes in decision block 1206, decision block 1207 determines if call hold has already been deactivated. If the answer is yes, control is transferred back to decision block 1202. If the answer in decision block 1207 is no, block 1208 sends a TRANS message to the other communication terminal which also indicates that call hold is being deactivated. Block 1209 then turns off the call hold indicator on the communication terminal executing FIG. 12.

It is to be understood that the above-described embodiments are merely illustrative of the principles of the invention and that other arrangements may be devised by those skilled in the art without departing from the spirit or scope of the invention. In particular, one skilled in the art could readily determine other telecommunication call features that could be utilized with the principles of the invention.

The invention claimed is:

1. A method for providing telecommunication features on an existing telecommunication call by telecommunication terminals and the telecommunication call is established through a telecommunication system over a telecommunication call path between a calling telecommunication terminal and a called telecommunication terminal, the method comprising the steps of:

detecting initiation of a first portion of an automatic call back feature on the existing telecommunication call;

adjusting the telecommunication bandwidth of the call to an amount to implement the first portion of the automatic call back feature by transmission of a first message for changing the telecommunication bandwidth through out the whole telecommunication call path;

detecting initiation of a second portion of the automatic call back feature; and adusting the telecommunication bandwidth of the call to an amount to implement the second portion of the automatic call back feature by transmission of a second message for changing the telecommunication bandwidth through out the whole telecommunication call path.

2. The method of claim 1 wherein the step of detecting initiation of the first portion comprises the step of determining that the called telecommunication terminal is busy;

notifying the user of the calling telecommunication terminal that the called telecommunication terminal is busy; and determining that the user of the calling telecommunication terminal is initiating the automatic call feature.

3. The method of claim 2 wherein the step of adjusting the telecommunication bandwidth of the call to implement the first portion comprises decreasing the telecommunication bandwidth.

4. The method of claim 3 further comprises the step of sending for the first portion a third message requesting that automatic call back be established between the called telecommunication terminal and calling telecommunication terminal.

5. The method of claim 3 wherein the step of decreasing comprises the step of setting the telecommunication bandwidth to that of a low speed data link.

6. The method of claim 2 wherein the step of detecting initiation of the second portion comprises the step of receiving a fourth message from the called telecommunication terminal indicating that the called telecommunication terminal is idle; and the step of adjusting the telecommunication bandwidth of the call to implement the second portion comprises increasing the telecommunication bandwidth.

7. The method of claim 6 further comprises, for the second portion, the step of signaling a user of the calling telecommunication terminal that the automatic call back feature is completed.

8. The method of claim 7 wherein the step of increasing comprises the step of setting the telecommunication bandwidth equal to the same level as before actuation of the first portion.

9. A method for providing telecommunication features on an existing telecommunication call by telecommunication terminals and the telecommunication call is established through a telecommunication system over a telecommunication call path between a calling telecommunication terminal and a called telecommunication terminal, the method comprising the steps of:

detecting initiation of a first portion of a call hold feature on the existing telecommunication call;

adjusting the telecommunication bandwidth of the call to an amount to implement the first portion of the call hold feature by transmission of a first message for changing the telecommunication bandwidth through out the whole telecommunication call path;

detecting initiation of a second portion of the call hold feature; and adjusting the telecommunication bandwidth of the call to an amount to implement the second portion of the call hold feature by transmission of a second message for changing the telecommunication bandwidth through out the whole telecommunication call path.

10. The method of claim 9 wherein the step of detecting initiation of the first portion comprises the step of determining that a user of the calling telecommunication terminal has indicated that the telecommunication call is to be placed on hold;

the step of adjusting the telecommunication bandwidth of the call to implement the first portion comprises the step of decreasing the telecommunication bandwidth; and the method further comprises, for the first portion, the step of notifying the user of the calling telecommunication terminal that the telecommunication call has been placed on hold.

11. The method of claim 10 wherein the step of decreasing comprises the step of setting the telecommunication bandwidth to that of a low speed data link.

12. The method of claim 10 wherein the step of detecting initiating of the second portion comprises the step of determining that the user of calling telecommunication terminal wants to take the telecommunication call off call hold; and the step of adjusting the telecommunication bandwidth of the call to implement the second portion comprises increasing the telecommunication bandwidth.

13. The method of claim 12 further comprises the step of signaling the user of the calling telecommunication terminal that the call hold feature is completed.

14. The method of claim 13 wherein the step of increasing comprises the step of setting the telecommunication bandwidth equal to the same level as before the start of the first portion.

15. An apparatus for providing telecommunication features on an existing telecommunication call and the telecommunication call is established through a telecommunication system over a telecommunication call path between a calling telecommunication terminal and a called telecommunication terminal, comprising:

means for detecting initiation of an automatic call back feature on the existing telecommunication call;

means for adjusting the telecommunication bandwidth of the call to an amount to implement the first portion of the automatic call back feature by transmission of a first message for changing the telecommunication bandwidth through out the whole telecommunication call path;

means for detecting initiation of a second portion of the one of the automatic call back feature; and means for adjusting the telecommunication bandwidth of the call to an amount to implement the second portion of the automatic call back feature by transmission of a second message for changing the telecommunication bandwidth through out the whole telecommunication call path.

16. The apparatus of claim 15 wherein the means for detecting initiation of the first portion comprises means for determining that the called telecommunication terminal is busy;

means for notifying the user of the calling telecommunication terminal that the called telecommunication terminal is busy; and means for determining that the user of the calling telecommunication terminal is initiating the automatic call feature.

17. The apparatus of claim 16 wherein the means for adjusting the telecommunication bandwidth of the call to the amount to implement the first portion comprises means for decreasing the telecommunication bandwidth.

18. The apparatus of claim 17 further comprises, for the first portion, means for sending a third message requesting that automatic call back be established between the called telecommunication terminal and calling telecommunication terminal.

19. The apparatus of claim 17 wherein the means for decreasing comprises means for setting the telecommunication bandwidth to that of a low speed data link.

20. The apparatus of claim 16 wherein the means for detecting initiation of the second portion comprises means for receiving a fourth message from the called telecommunication terminal indicating that the called telecommunication terminal is idle; and the means for adjusting the telecommunication bandwidth of the call to an amount to implement the second portion comprises means for increasing the telecommunication bandwidth.

21. The apparatus of claim 20 further comprises, for the second portion, means for signaling a user of the calling telecommunication terminal that the automatic call back feature is completed.

22. The apparatus of claim 21 wherein the means for increasing comprises means for setting the telecommunication bandwidth equal to the same level as before actuation of the first portion.

23. An apparatus for providing telecommunication features on an existing telecommunication call and the telecommunication call is established through a telecommunication system over a telecommunication call path between a calling telecommunication terminal and a called telecommunication terminal, comprising:

means for detecting initiation of a call hold feature on the existing telecommunication call;

means for adjusting the telecommunication bandwidth of the call to an amount to implement the first portion of the call hold feature by transmission of a first message for changing the telecommunication bandwidth through out the whole telecommunication call path;

means for detecting initiation of a second portion of the call hold feature; and means for adjusting the telecommunication bandwidth of the call to an amount to implement the second portion of the call hold feature by transmission of a second message for changing the telecommunication bandwidth through out the whole telecommunication call path.

24. The apparatus of claim 23 wherein the means for detecting initiation of the first portion comprises means for determining that a user of the calling telecommunication terminal has indicated that the telecommunication call is to be placed on hold;

the means for adjusting the telecommunication bandwidth of the call to implement the first portion comprises means for decreasing the telecommunication bandwidth; and the apparatus further comprises, for the first portion, means for notifying the user of the calling telecommunication terminal that the telecommunication call has been placed on hold.

25. The apparatus of claim 24 wherein the means for decreasing comprises means for setting the telecommunication bandwidth to that of a low speed data link.

26. The apparatus of claim 24 wherein the means for detecting initiation of the second portion comprises means for determining that the user of calling telecommunication terminal wants to take the telecommunication call off call hold; and the means for adjusting the telecommunication bandwidth of the call to implement the second portion comprises means for increasing the telecommunication bandwidth.

27. The apparatus of claim 26 further comprises means for signaling the user of the calling telecommunication terminal that the call hold feature is completed.

28. The apparatus of claim 27 wherein the means for increasing comprises means for setting the telecommunication bandwidth equal to the same level as before the start of the first portion.

* * * * *